(12) United States Patent
Kussmaul et al.

(10) Patent No.: US 11,210,352 B2
(45) Date of Patent: Dec. 28, 2021

(54) AUTOMATIC CHECK OF SEARCH CONFIGURATION CHANGES

(71) Applicant: International Business Machines Corporation, Armonk, NY (US)

(72) Inventors: Timo Kussmaul, Boeblingen (DE); Uwe K. Hansmann, Tuebingen (DE)

(73) Assignee: International Business Machines Corporation, Armonk, NY (US)

( * ) Notice: Subject to any disclaimer, the term of this patent is extended or adjusted under 35 U.S.C. 154(b) by 472 days.

(21) Appl. No.: 16/384,974

(22) Filed: Apr. 16, 2019

(65) Prior Publication Data

US 2020/0334302 A1 Oct. 22, 2020

(51) Int. Cl.
  *G06F 16/00* (2019.01)
  *G06F 16/953* (2019.01)
  *G06F 11/36* (2006.01)

(52) U.S. Cl.
  CPC ........ *G06F 16/953* (2019.01); *G06F 11/3688* (2013.01)

(58) Field of Classification Search
  None
  See application file for complete search history.

(56) References Cited

U.S. PATENT DOCUMENTS

| | | |
|---|---|---|
| 7,689,580 B2 | 3/2010 | Wang |
| 7,895,181 B2 | 2/2011 | Shaw |
| 8,793,573 B2 | 7/2014 | Beckmann |
| 8,832,076 B2 | 9/2014 | Gutlapalli |
| 9,098,497 B1 | 8/2015 | Brette |
| 9,213,749 B1 | 12/2015 | Collins |
| 9,361,317 B2 | 6/2016 | Lightner |
| 9,432,943 B2 * | 8/2016 | Alam ................ H04W 52/0254 |
| 9,563,621 B2 | 2/2017 | Halme |
| 9,697,016 B2 | 7/2017 | Jacob |
| 9,697,258 B2 | 7/2017 | Barton |
| 9,734,518 B2 | 8/2017 | Suleman |

(Continued)

FOREIGN PATENT DOCUMENTS

| | | |
|---|---|---|
| JP | 2004112318 A | 4/2004 |
| JP | 4042100 B2 | 2/2008 |
| WO | 200109017 A1 | 3/2001 |

OTHER PUBLICATIONS

Kussmaul, "Improved Navigation Paths Between Content Items", U.S. Appl. No. 16/384,977, filed Apr. 16, 2019.

(Continued)

*Primary Examiner* — Debbie M Le
(74) *Attorney, Agent, or Firm* — Alexander G. Jochym (57) ABSTRACT

The invention relates to a method for automatically checking configuration changes intended to be applied to a search configuration. of a search engine of a search service. The method comprises creating a test search configuration, which comprises a copy of the search configuration. The intended configuration changes are applied to the copy of the search configuration. A set of sample documents and a set of test search queries are provided. The test search queries are executed on the set of sample documents using the test search configuration and performance indicators are determined for the execution. If the performance indicators satisfy a predefined criterion, the intended configuration changes are accepted for application to the search configuration.

20 Claims, 5 Drawing Sheets

(56) References Cited

U.S. PATENT DOCUMENTS

| | | | |
|---|---|---|---|
| 2008/0208808 A1* | 8/2008 | Sue | G06F 16/951 |
| 2012/0078874 A1 | 3/2012 | Gonzalez | |
| 2014/0358887 A1 | 12/2014 | Morris | |
| 2015/0309698 A1 | 10/2015 | Senderek | |
| 2016/0110460 A1* | 4/2016 | Johnson | G06F 16/24578 |
| | | | 707/707 |
| 2017/0169111 A1 | 6/2017 | Baum | |
| 2017/0201523 A1 | 7/2017 | Palmer | |
| 2017/0220605 A1 | 8/2017 | Nivala | |
| 2017/0357725 A1 | 12/2017 | Hornkvist | |
| 2018/0121556 A1 | 5/2018 | Badros | |

OTHER PUBLICATIONS

Kussmaul, et al., "Automatic Adaption of a Search Configuration", U.S. Appl. No. 16/384,973, filed Apr. 16, 2019.
Kussmaul, et al., "Managing Search Queries of a Search Service", U.S. Appl. No. 16/384,979, filed Apr. 16, 2019.
Kussmaul, et al., "Personalizing a Search of a Search Service", U.S. Appl. No. 16/384,981, filed Apr. 16, 2019.
Kussmaul, et al., "Preventing Search Fraud", U.S. Appl. No. 16/384,978, filed Apr. 16, 2019.
Kussmaul, et al., "User-Driven Adaptation of Rankings of Navigation Elements", U.S. Appl. No. 16/384,975, filed Apr. 16, 2019.
List of IBM Patents or Patent Applications Treated as Related, Appendix P, Filed Herewith.
"Amazon Cloudsearch", 7 pages, Jul. 3, 2018, copyright 2018, Amazon Web Services, <https://aws.amazon.com/cloudsearch/>.
"Autoregressive model", From Wikipedia, the free encyclopedia, Last edited Mar. 28, 2019, <https://en.wikipedia.org/wiki/Autoregressive_model>.
"Bayes' theorem", From Wikipedia, the free encyclopedia, Last edited on Mar. 16, 2019, <https://en.wikipedia.org/wiki/Bayes'_theorem>.
"Bayesian inference", From Wikipedia, the free encyclopedia, Last edited on Mar. 29, 2019, <https://en.wikipedia.org/wiki/Bayesian_inference>.
"Bayesian probability", From Wikipedia, the free encyclopedia, Last edited on Feb. 23, 2019, <https://www/en.wikipedia.org/wiki/Bayesian_probability>.
"Bayesian statistics", From Wikipedia, the free encyclopedia. Last edited on Apr. 12, 2019, 4 pages, https://en.wikipedia.org/wiki/Bayesian_statistics#cite_note-bda-1>.
"Conditional probability", From Wikipedia, the free encyclopedia, Last edited on Mar. 18, 2019, <https://en.wikipedia.org/wiki/Conditional_probability>.
"Errors and residuals", From Wikipedia, the free encyclopedia, last edited Dec. 28, 2018, <www.https://en.wikipedia.org/wiki/Erros_and_residuals>.
"Event (probability theory)", From Wikipedia, the free encyclopedia, Last edited on Mar. 25, 2019, <https:/en.wikipedia.org/wiki/Event_(probability_theory)>.
"Frequentist probability", From Wikipedia, the free encyclopedia, Last edited on Mar. 14, 2019, <https://en.wikipedia.org/wiki/Frequentist_probability>.
"George E.P. Box", From Wikipedia, the free encyclopedia, Last edited on Mar. 29, 2019, <www.https://en.wikipedia.org/wiki/George_E._P._Box>.
"Gwilym Jenkins", From Wikipedia, the free encyclopedia, Last edited on Jan. 12, 2017, <www.https://en.wikipedia.org/wiki/Gwilym_Jenkins>.
"Headless Crawling", 2 pages, printed Jul. 3, 2018, copyright 2017 Ryte, <https://en.ryte.com/wiki/Headless_Crawling>.

"JaSpell::Java Spelling Checking Package", SourceForge, 2004 copyright Bruno Marins—XLDB Group, Apr. 12, 2019, 1 page, <http://jaspell.sourceforge.net/>.
"Limit of a sequence", From Wikipedia, the free encyclopedia, Last edited on Feb. 6, 2019, <https://en.wikipedia.org/wiki/Limit_of_a_sequence>.
"Linear combination", From Wikipedia, the free encyclopedia, Last edited Oct. 22, 2018, <https://en.wikipedia.org/wiki/Linear_combination>.
"Moving-average model", From Wikipedia, the free encyclopedia, Last edited on Dec. 8, 2018, <https://en.wikipedia.org/wiki/Moving-average-model>.
"Open-Source Content Management Systems Lack Security", 5 pages, Aug. 25, 2018, <https://expert.services.blog/managing-your-website/security/hacking-open-source-cms.html>.
"Peter Whittle (mathematician)", From Wikipedia, the free encyclopedia, Last Edited on Feb. 27, 2019, <https://en.wikipedia.org/wiki/Peter_Whittle_(mathematician)>.
"Probability distribution", From Wikipedia, the free encyclopedia, Last edited on Mar. 29, 2019, <https://en.wikipedia.org/wiki/Probability_distribution>.
"Probability interpretations", From Wikipedia, the free encyclopedia, Last edited on Feb. 28, 2019, <https://en.wikipedia.org/wiki/Probability_interpretations>.
"Probability", From Wikipedia, the free encyclopedia, Last Edited on Mar. 18, 2019, <https://en.wikipedia.org/wiki/Probability>.
"Stationary process", From Wikipedia, the free encyclopedia, Last edited on Mar. 15, 2019, <https://en.wikipedia.org/wiki/Stationary_process>.
"Statistical model", From Wikipedia, the free encyclopedia, Last edited on Apr. 1, 2019, <https://en.wikipedia.org/wiki/Statistical_model>.
"Statistics", From Wikipedia, the free encyclopedia, Last edited on Mar. 29, 2019, <https://en.wikipedia.org/wiki/Statistics>.
"The making of ERS 2.0—Getting Started with Cloud CMS", 17 pages, 2017, The Headless Meet Cloud CMS, <https://www.google.com/url?sa=t&rct=j&q=&esrc=s&source=web&cd=1&ved=0ahUKEwj-plSd85bcAhWDfisKHYqbBa4QFggnMAAA&url=https%3A%2F%2Fwww.cloudcms.com%2Fdownloads%2Fpdfs%2FThe_Making_of_ERS.pdf&usg=AOvVaw1A17jUjRveK-5zAixyNjus>.
"Time series", From Wikipedia, the free encyclopedia, Last edited on Mar. 13, 2019, <https://en.wikipedia.org/wiki/Time_series>.
Adhikari, et al., "An Introductory Study on Time Series Modeling and Forecasting", 67 pages, <https://arxiv.org/ftp/arxiv/papers/1302/1302.6613.pdf>.
Cleveland, et al., "STL: A Seasonal-Trend Decomposition Procedure Based on Loess", journal of Official Statistics, vol. 6, No. 1, 1990, pp. 3-73, <https://www.wessa.net/download.stl.pdf>.
Exalead, "Search-Based Applications (SBAs)", Exalead Solutions Brief: Search-Based Applications (SBAs), v 1.1 © 2010 Exalead, pp. 1-8.
Kauffman, "A Better Authoring Experience for Headless CMS's", Mar. 7, 2018, pp. 1-4, <https://www.bloomreach.com/en/blog/2018/03/a-better-authoring-experience-for-headless-cms%E2%80%99s.html>.
Mell et al., "The NIST Definition of Cloud Computing", Recommendations of the National Institute of Standards and Technology, Special Publication 800-145, Sep. 2011, 7 pages.
Rack Blogger, "Content Management System Comparison: Performance Optimization", Jan. 20, 2011, The Official Rackspace Blog, 3 pages, <https://blog.rackspace.com/content_management_system_comparison_performance_optimization>.
Whittle, Peter, "Hypothesis testing in time series analysis", Uppsala, Almqvist & Wiksells boktr. 1951, 120 pages, <https://www.worldcat.org/title/hypothesis-testing-in-time-series-analysis/oclc/22153644>.

* cited by examiner

AUTOMATIC CHECK OF SEARCH CONFIGURATION CHANGES

BACKGROUND

The present disclosure relates to the field of electronic data processing and, more specifically, to automatically checking of configuration changes intended to be applied to a search configuration of a search engine of a search service.

In order to handle large data collections search services may be used. Such search services enable retrieving and presenting information from those large data collections in response to queries executed on the data collections. The data processing executed by a search service is defined by a search configuration. In order to adjust a search service to specific requirements or preferences of different users, the search service may allow modifying search configurations. However, modifying search configurations may require state of the art knowledge of the search engine used by the search service. Without that knowledge, there may be a risk for misconfigurations resulting from modifications implemented by users without that knowledge, which may lead to performance degradation and/or system misbehavior, when executing searches.

SUMMARY

Various embodiments provide a method for automatically checking of configuration changes intended to be applied to a search configuration of a search engine of a search service as well as a computer program product and a computer system for executing the method as described by the subject matter of the independent claims. Advantageous embodiments are described in the dependent claims. Embodiments of the present invention can be freely combined with each other if they are not mutually exclusive.

In one aspect, the invention relates to a method for automatically checking one or more configuration changes intended to be applied to a search configuration of a search engine of a search service. The search configuration is represented by a set of one or more configuration parameters. Each of the one or more intended configuration changes is defined by a set of one or more configuration parameter changes which are to be applied to the search configuration.

The method comprises providing the one or more intended configuration changes. A test search configuration is created. The creating of the test search configuration comprises copying the search configuration and applying the one or more intended configuration changes to the copy of the search configuration. A set of one or more sample documents is provided as well as a set of one or more test search queries. The set of test search queries is executed on the set of sample documents. For the execution, the test search configuration is used and a set of one or more performance indicators is determined for the executing of the set of test search queries. The one or more intended configuration changes are accepted for application to the search configuration, if the set of performance indicators satisfies a predefined criterion. Satisfying the predefined criterion requires at least one of the performance indicators of the set of performance indicators to exceed a threshold.

In a further aspect, the invention relates to a computer program product comprising a non-volatile computer-readable storage medium having computer-readable program code embodied therewith for automatically checking one or more configuration changes intended to be applied to a search configuration of a search engine of a search service. The search configuration is represented by a set of one or more configuration parameters. Each of the one or more intended configuration changes is defined by a set of one or more configuration parameter changes which are to be applied to the search configuration.

The automatic checking comprises providing the one or more intended configuration changes. A test search configuration is created. The creating of the test search configuration comprises copying the search configuration and applying the one or more intended configuration changes to the copy of the search configuration. A set of one or more sample documents is provided as well as a set of one or more test search queries. The set of test search queries is executed on the set of sample documents. For the execution, the test search configuration is used and a set of one or more performance indicators is determined for the executing of the set of test search queries. The one or more intended configuration changes are accepted for application to the search configuration, if the set of performance indicators satisfies a predefined criterion. Satisfying the predefined criterion requires at least one of the performance indicators of the set of performance indicators to exceed a threshold.

In a further aspect, the invention relates to a computer system for automatically checking one or more configuration changes intended to be applied to a search configuration of a search engine of a search service. The search configuration is represented by a set of one or more configuration parameters. Each of the one or more intended configuration changes is defined by a set of one or more configuration parameter changes which are to be applied to the search configuration.

The computer system comprises a processor and a memory storing machine-executable program instructions. Executing the program instructions by the processor causes the processor to control the computer system to provide the one or more intended configuration changes. A test search configuration is created. The creating of the test search configuration comprises copying the search configuration and applying the one or more intended configuration changes to the copy of the search configuration. A set of one or more sample documents is provided as well as a set of one or more test search queries. The set of test search queries is executed on the set of sample documents. For the execution, the test search configuration is used and a set of one or more performance indicators is determined for the executing of the set of test search queries. The one or more intended configuration changes are accepted for application to the search configuration, if the set of performance indicators satisfies a predefined criterion. Satisfying the predefined criterion requires at least one of the performance indicators of the set of performance indicators to exceed a threshold.

BRIEF DESCRIPTION OF THE SEVERAL VIEWS OF THE DRAWINGS

In the following, embodiments of the invention are explained in greater detail, by way of example only, making reference to the drawings in which.

DETAILED DESCRIPTION

The descriptions of the various embodiments of the present invention are being presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

Embodiments may have the beneficial effect of providing an efficient and effective method for automatically checking one or more configuration changes intended to be applied to a search configuration of a search engine of a search service. By applying the intended configuration changes to the copy of the search configuration a test search configuration is generated on which the performance effects of the respective may effectively be tested. In case the resulting performance measured by performance indicators for the executing of a set of test search queries are satisfying the intended configuration changes are accepted. Such an approach may be beneficial for implementing an automation of configuration change checking. It may for example be beneficial for checking intended configuration changes first suggested or used for a different search configuration. For the result of the check it may easily become obvious whether intended configuration changes are also compatible with the search configuration for which they are tested and whether the performance effects achieved are sufficient, i.e. whether the resulting performance indicators satisfies a predefined criterion.

A search service may be configured to provide search functionality to multiple tenants. For example, the search service may be implemented in form of a cloud search service, like e.g. the Watson® Content Hub search service. The search service may offer tenant specific search collections, each search collection being configured separately and/or comprising a specific search index. According to embodiments, each search collection may be assigned to a different tenant, i.e. search collections may not be shared between different tenants. According to embodiments, multiple separate search collections may be assigned to the same tenant. According to embodiments, one or more search collections may be assigned to multiple tenants, i.e. search collections may be shared between different tenants.

The search configuration may provide configuration parameters which are used by the search service, i.e. the search engine of the search service, for defining indexing, querying, ranking behavior and/or data management and memory management aspects of the search service. For example, the search configuration may define a schema, i.e. a data structure, for documents of a collection of documents to be searched, field types, analyzers and tokenizers to be used for each field type during indexing and querying, configuration parameters for the respective analyzers and tokenizers, like e.g. definitions of which synonyms to use for a synonym filter, and/or configuration parameters for query and request handlers, like e.g. definitions of which kind of queries, index uploads, etc. are supported. A search service may allow tenants to define or change a tenant specific search configuration. However, this requires state of the art knowledge of the search engine used. Thus, there may be a potential for misconfigurations resulting from definitions and/or changes implemented by a tenant, leading to errors during indexing and querying, insufficient search quality, performance degradation and/or system misbehavior, like e.g. memory mismanagement.

Embodiments may have the beneficial effect of enabling automatic checks of configuration changes intended to be applied to a search configuration. Thus, means for supporting users during search configuration may be provided. For example, the search engine may be extended by a search configuration managing (SCM) component. The SCM component may provide functionality for automatically testing and assessing a potential search modification of a search configuration.

A search service is a service enabling discovering, crawling, transforming and/or storing information, e.g. text-based information, for retrieval and presentation in response to a query. A search service may comprise one or more search configuration, each search configuration being represented by a set of one or more configuration parameters defining a configuration of the search service. A search configuration may for example be assigned to a tenant. Furthermore, a search service may comprise a search facade, a search engine as well as one or more search indexes. A search facade, also referred to as a search interface, is configured for receiving requests providing search queries and evaluating access rights. Furthermore, a search facade may ensure that individual tenants only see their own data, i.e. data which is assigned to them and/or for which they have access rights. A search engine is an information retrieval software program configured for discovering, crawling, transforming and/or storing information for retrieval and presentation in response to a query. The search engine may comprise a crawler, indexer and/or a database. A crawler may be configured for traversing websites to retrieve their content, e.g. as documents, to store them in a search collection, i.e. a collection of data, in order to provide a collection of documents to be searched. For deriving the documents to be stored in the search collection, a crawler may e.g. deconstructing datasets provided by the websites, like e.g. document texts, and/or assigning surrogates for storage in a search index. The indexer may be configured for generating and amending search indexes. The search index may be stored in a database assigned to the search engine. A search engine may furthermore store images, link data and/or metadata of the data, e.g. documents, comprised by the search collections. A search engine may for example execute operations required to index documents and perform text-based searches using the indexed documents. A search engine may for example be configured as a web search engine for searching information on the world wide web or as a database search engine configured for searching information on a database. A search index, also referred to as a search collection, is an index generated for a collection of data, e.g. documents, to be searched. A search index may be configured for and assigned to an individual tenant. Search engine indexing refers to collecting, parsing, and storing data from a collection of data to be searched in order to facilitate fast and accurate information retrieval.

A search service may for example be provided in form of a cloud service. Such a cloud-based service may be configured for serving multiple tenants with one deployment. A tenant is a group of users, e.g. a company, who share a common access with specific privileges to the search engine. Data to be searched may be defined as tenant specific data with access rights only for the respective tenant to which it is assigned. The search service may ensure that tenant specific data is isolated from other tenants. The search service may comprise a plurality of search configurations, each search configuration assigned to an individual tenant. Service requests received from clients may contain a tenant id of the tenant which is associated with a request. The respective tenant id may allow the search service and/or the infrastructure providing the search service to identify a search configuration assigned to the respective tenant and to be used for processing the received request.

A search service may provide functionality for searching in unstructured data, like e.g. text documents. For this purpose, a search service provides functionality to create a search index by indexing content items, i.e. data to be searched, like e.g. text documents. A search index may contain a representation of a data content to be searched, in a representation which is suited, e.g. improved, for processing by the search service. The search service may provide an application programming interface API for indexing content items, which makes the respective content items searchable by the search service. Further the search service may provide a query API allowing a client, e.g. another service or an application, to issue a search query. A search query may contain a set of query parameters specifying search criteria for searching content items, like e.g. a set of search terms. The search service may process the query by selecting and ranking a set of content items according to a search query. The ranking may determine a scoring or an order of the respective content items relative to the search query, which represents for each of the content items a level of relevance in relation to the respective search query. A search query may also contain parameters for controlling the ranking, like e.g. a ranking query, a boost query and/or a boost function. Furthermore or alternatively, a search service may automatically select one or more heuristics and/or parameters for a search ranking. A search ranking may for example be based on statistics about the search collection and the search terms used for a search. Furthermore, the search ranking may be based on statistics of an occurrence of search terms in specific content items.

For a ranking, e.g. the tf-idf method (term frequency-inverse document frequency) may be used, which is a numerical statistic intended to reflect an importance or relevance of a word for a document in a search collection. Tf-idf values may be used in search service as weighting factors in ranking a document's relevancy relative to a given search query. An tf-idf value increases proportionally to the number of times a word appears in a document and is offset by the frequency of appearance of the word in the search collection.

A search service may manage multiple search indexes, e.g. assigned to multiple tenants. Thu, a search service may be used in a multi-tenant environment e.g. by creating a separate search index for each tenant. In this case, search client services may be required to correctly select the correct index to use for search requests depending on a tenant context.

A search service may be designed to provide efficiently full text search results. Documents to be searched may be provided to a search service, which analyzes the documents and puts the relevant data in a search index. Search indexes may also be used to separate data. In modern multi-tenant content management systems, like e.g. Watson® Content Hub, search collections are used to separate data from different tenants. Watson® Content Hub is a cloud-based content management system (CMS) allowing to content-enable applications, e.g. mobile apps, single-page applications, billboards, embedded devices, etc.

A search index may be associated with a specific search configuration, consisting of multiple configuration parameters defining settings which control search functionality, behavior and e.g. the structure of the content items in a search index. Search configuration parameters may be updatable and/or changeable via a search service API or by uploading a set of configuration parameter changes, e.g. in form of one or more configuration files, to the search service, a file system or a persistent storage the search service is using.

A search index may be configured according to a search index individual index schema. The index schema may define how to build an index from input documents. Each index schema may comprise one or more fields. Fields of an index schema may comprise different types of data. A name field, for example, may comprise text, i.e. character data, size field may comprise a floating-point number.

A search service may further be configured to collect statistics on a search index and its use. For example, a search service may enable querying top searched terms for a field of choice of a search index. A search service may further provide search suggestions and/or a spellchecking. Search suggestions and/or a spellchecking provided by the search service may comprise a definition for an implementation of a lookup and/or a dictionary. Additionally, a search service may provide a request handler for processing search suggestion/spellchecking requests. A search configuration may therefor also comprise configuration parameters for configuring the respective request handler.

According to embodiments, the method further comprises rejecting the one or more intended configuration changes, if the set of the performance indicators does not satisfy the predefined criterion. Embodiments may have the beneficial effect of preventing incompatible and/or insufficient configuration changes from being implemented and avoiding misconfigurations resulting from implementing such incompatible and/or insufficient configuration changes.

According to embodiments the intended configuration changes may be flagged as executable in the search engine or flagged as non-executable based on the result of the performance check. If the intended configuration changes are accepted, they may be flagged as executable, otherwise they may be flagged as non-executable.

According to embodiments, the set of test search queries is in addition executed on the set of sample documents using the search configuration without the intended search configuration changes applied and a set of one or more additional performance indicators is determined. The one or more additional performance indicators may be used as thresholds to be exceeded by the one or more performance indicators in order to satisfy the predefined criterion. Embodiments may have the beneficial effect of guaranteeing that a search performance as indicated by the performance indicators is improved by applying the intended search configuration changes.

According to embodiments, the threshold may be evaluated for each of the test queries individually. According to embodiments, a sum or an average of the performance indicators over the test queries may be calculated and the result may be compared with the threshold. According to embodiments, e.g. by the search service administrator, weighting factors may be provided for the test search queries to the search performance managing component, in order to indicate which of the test queries are more and which are less important. The weighting factors may e.g. be used to weight the performance indicators resulting from executing the respective test queries. The weighting factors may e.g. be based on a number of times the respective test queries, which were executed in a given past time frame.

According to embodiments, the one or more intended configuration changes are automatically applied to the search configuration in reply to the accepting for application. Embodiments may have the beneficial effect that compatible and sufficient configuration changes are automatically implemented and are thus available for use. The respective configuration changes may for example help to improve the performance of a search engine in view of an event, like a seasonally occurring high load of search queries for particular contend items, expected to occur.

According to embodiments, the method further comprises, in reply to accepting the one or more intended configuration changes for application to the search configuration, issuing a request for a user approval to the one or more intended configuration changes. In reply to receiving a user approval to the one or more intended configuration changes, the one or more intended configuration changes are applied to the search configuration. Embodiments may have the beneficial effect that the intended configuration changes are prevented from being implemented without an approval by a user. Thus, the final decision whether the respective configuration changes are indeed implemented may rest with the user.

According to embodiments, the providing of the one or more intended configuration changes comprises receiving one or more of the intended configuration changes in form of one or more user defined, e.g. by a search service administrator or a tenant, configuration changes. Embodiments may have the beneficial effect of enabling an automated checking of user defined configuration changes for their compatibility with the search configuration for which they are intended and their effect on the performance of the respective search configuration. Thereby, misconfigurations resulting from implementing incompatible and/or disadvantageous configuration changes may be avoided.

According to embodiments, the providing of the one or more intended configuration changes comprises deriving the one or more intended configuration changes using a first set of one or more additional search configurations. Each additional search configuration is assigned with an additional search configuration change. Each of the assigned additional search configuration changes is a search configuration change used in the past for adapting the search configuration to which it is assigned. The deriving of the intended configuration change comprises determining one or more additional search configurations similar to the search configuration. For each of the one or more additional search configurations similar to the search configuration the additional search configuration change assigned to the respective additional search configuration is identified. One or more additional search configuration changes identified as the one or more intended search configuration changes are used.

Embodiments may have the beneficial effect of automatically suggesting configuration changes. Suggested configuration changes may comprise configuration changes which have been successfully implemented in other search configurations or temporally in the same search configuration in the past. The suggestion may e.g. be triggered by an event expected to occur due to a high probability of occurrence, the occurrence of which has coincided with an implementation of the suggested configuration changes in the past.

According to embodiments, the determining of one or more additional search configurations similar to the search configuration comprises applying a clustering to the search configuration and the first set of additional search configurations. Additional search configurations comprised by the same cluster as the search configuration are identified to be similar to the search configuration. Embodiments may have the beneficial effect of enabling an effective and efficient determination of search configurations similar to a given search configuration, from which potentially beneficial configuration changes may be derived for the given search configuration. The respective search configurations may e.g. be assigned to different tenants.

A clustering refers to the task of grouping a set of data objects, e.g. search configurations, in such a way that data objects in the same group, i.e. in the same cluster, are more similar according to one or more criteria to each other than to those data objects in clusters. A clustering may be implemented using various algorithms. The clustering may e.g. be a connectivity-based clustering, also known as hierarchical clustering, a centroid-based clustering, like e.g. k-means clustering, a distribution-based clustering, like e.g. Gaussian mixture model clustering, or a density-based clustering. Thus, the clustering may e.g. be based on distances between the data objects in a specific representation of the respective data objects, dense areas of the data space, intervals or particular statistical distributions.

The clustering may be referred to as a type of unsupervised learning. Unsupervised learning refers to a branch of machine learning that learns from test data that has not been labeled, clustered or classified. Rather than responding to feedback, unsupervised learning identifies commonalities in data provided and reacts based on a detected presence or absence of the respective commonalities in each new dataset.

According to embodiments, the set of performance indicators comprises indicators for one or more of the following features of the search service executing the test search queries using the test search configuration: a response-time, an error rate, a memory consumption and a CPU consumption. Embodiments may have the beneficial effect that the automated decision of whether an intended configuration change is to be accepted is made based performance indicators of the search service, like e.g. response-time, error rate, memory consumption and CPU consumption. Thus, a sufficient or even improving performance of the search serving using the search configuration with the intended configuration changes may be guaranteed.

A search service may consume system resources depending on the number of search collections the search services needs to manage. The larger the number of search collections, the larger the consume of system resources may be. System resources may comprise system memory, CPU cycles, space required for persistent data storage with a dependency on the number of search collections available. System memory used may comprise a search collection specific caching. Over average CPU cycles may require updating search collections. Persistent data storage may depend on factors like e.g. the amount of metadata, size of a vocabulary and/or occurrences of individual terms spread over indexed documents.

According to embodiments, the providing of the set of test queries comprises receiving one or more test queries in form of one or more user, e.g. by a search service administrator or a tenant, defined test queries. Embodiments may have the beneficial effect of e.g. using queries as test queries which are intended by the user to be used later on for actual searches with the search configuration modified by implementing the intended configuration change.

According to embodiments, the providing of the set of test queries comprises selecting one or more search queries from a set of one or more search queries applied to the search configuration in the past. Embodiments may have the beneficial effect of enabling an automated provision of search queries. The selection may e.g. be based on a frequency or number of usages of the respective search queries in the past.

According to embodiments, the providing of the set of test queries comprises selecting one or more search queries from a set of one or more search queries applied to one or more additional search configurations in the past. Embodiments may have the beneficial effect of enabling an automated provision of search queries. The selection may e.g. be based on a frequency or number of usages of the respective search queries in the past. The additional search configurations may for example be assigned to different tenants.

According to embodiments, the threshold is received in form of a user defined threshold, e.g. by a search service administrator or a tenant. Embodiments may have the beneficial effect of enabling the user to define a minimum level of performance to be achieved by implementing the intended configuration changes. According to embodiments, the threshold is derived using a set of one or more additional performance indicators determined for executing search queries in the past. Embodiments may have the beneficial effect of guaranteeing that the intended configuration changes result in a performance improved relative to a performance achieved before. For example, the intended configuration changes may be suggested in order to maintain a response-time achieved before even in case of an increased search load. According to embodiments, the threshold is derived using a set of one or more additional performance indicators determined for executing the set of test search queries on the set of sample documents using the search configuration, i.e. the initial search configuration without the intended configuration changes. For example, the threshold derived comprises a set of one or more improved performance indicators. The improved performance indicators being improved relative to the additional performance indicators. Embodiments may have the beneficial effect of guaranteeing that the intended configuration changes result in a performance improved relative to a performance achieved without the intended configuration changes. Depending on the degree of improvement of the improved performance indicators relative to the additional performance indicators, the degree of improvement of the performance required for accepting the intended search configuration changes may be controlled. According to embodiments, the threshold comprises a set of one or more additional performance indicators determined for executing the set of test search queries on the set of sample documents using the search configuration. Embodiments may have the beneficial effect of guaranteeing that the intended configuration changes result in a performance improved relative to a performance achieved without the intended configuration changes.

According to embodiments, a threshold is provided for each performance indicator of the set of performance indicators. Embodiments may have the beneficial effect of taking into account all of the performance indicators, when evaluating the effects of an implementation of the intended search configuration changes. According to embodiments, satisfying the predefined criterion requires each performance indicator of the one or more performance indicators to exceed the threshold provided for the respective performance indicator. According to embodiments, satisfying the predefined criterion requires a predefined minimum number of performance indicators of the set of performance indicators to exceed the threshold provided for the performance indicator of the predefined minimum number.

According to embodiments, the providing of the set of documents comprises receiving one or more sample documents in form of one or more user defined, e.g. by a search service administrator or a tenant, sample documents. Embodiments may have the beneficial effect of e.g. using documents as sample documents which are intended by the user to be used later as a basis on for actual searches with the search configuration modified by implementing the intended configuration change.

According to embodiments, the providing of the set of sample documents comprises selecting one or more sample documents from a set of one or more documents for which the search configuration has been used in the past. Embodiments may have the beneficial effect of enabling an automated provision of sample documents. The selection may e.g. be based on a frequency or number of search hits comprised by the respective documents in the past.

According to embodiments, the providing of the set of one or more sample documents comprises selecting one or more sample documents from a set of one or more documents for which one or more additional search configurations have been used in the past. Embodiments may have the beneficial effect of enabling an automated provision of sample documents. The selection may e.g. be based on a frequency or number of search hits comprised by the respective documents in the past. The additional search configurations may for example be assigned to different tenants.

According to embodiments, the method further comprises determining one or more additional search configurations of a second set of additional search configurations similar to the search configuration. For each of the one or more additional search configurations similar to the search configuration the one or more intended configuration changes accepted for application to the search configuration are recommended to be applied to the respective additional search configuration. Embodiments may have the beneficial effect of using the intended configuration changes, which have been determined to be acceptable, to improve additional search configurations. Additional search configurations similar to the search configuration may for example be determined in regular intervals, upon applying of configuration changes or upon generation of a further search configuration. For each of the additional search configurations determined, an additional test search configuration may be generated for checking whether the intended configuration changes are also compatible with the respective additional search configuration. The additional test search configurations may be used to determining performance indicators and checking whether the respective performance indicators exceed a threshold. The respective threshold may for example be provided in form of performance indicators determined for the additional search configuration without the intended configuration changes applied.

According to embodiments, the determining of one or more additional search configurations similar to the search configuration comprises applying a clustering to the search configuration and the second set of additional search configurations. Additional search configurations of the second set of additional search configurations comprised by the same cluster as the search configuration are identified to be similar to the search configuration. Embodiments may have the beneficial effect of enabling an effective and efficient determination of additional search configurations similar to a given search configuration, for which the accepted configuration changes may be beneficial as well. The respective search configurations may e.g. be assigned to different tenants.

According to embodiments, the computer program product further comprises computer-readable program code configured to implement any of the embodiments of the method for automatically checking one or more configuration changes intended to be applied to a search configuration of a search engine of a search service described herein.

According to embodiments, the computer system further is configured to execute any of the embodiments of the method for automatically checking one or more configuration changes intended to be applied to a search configuration of a search engine of a search service described herein.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 1:
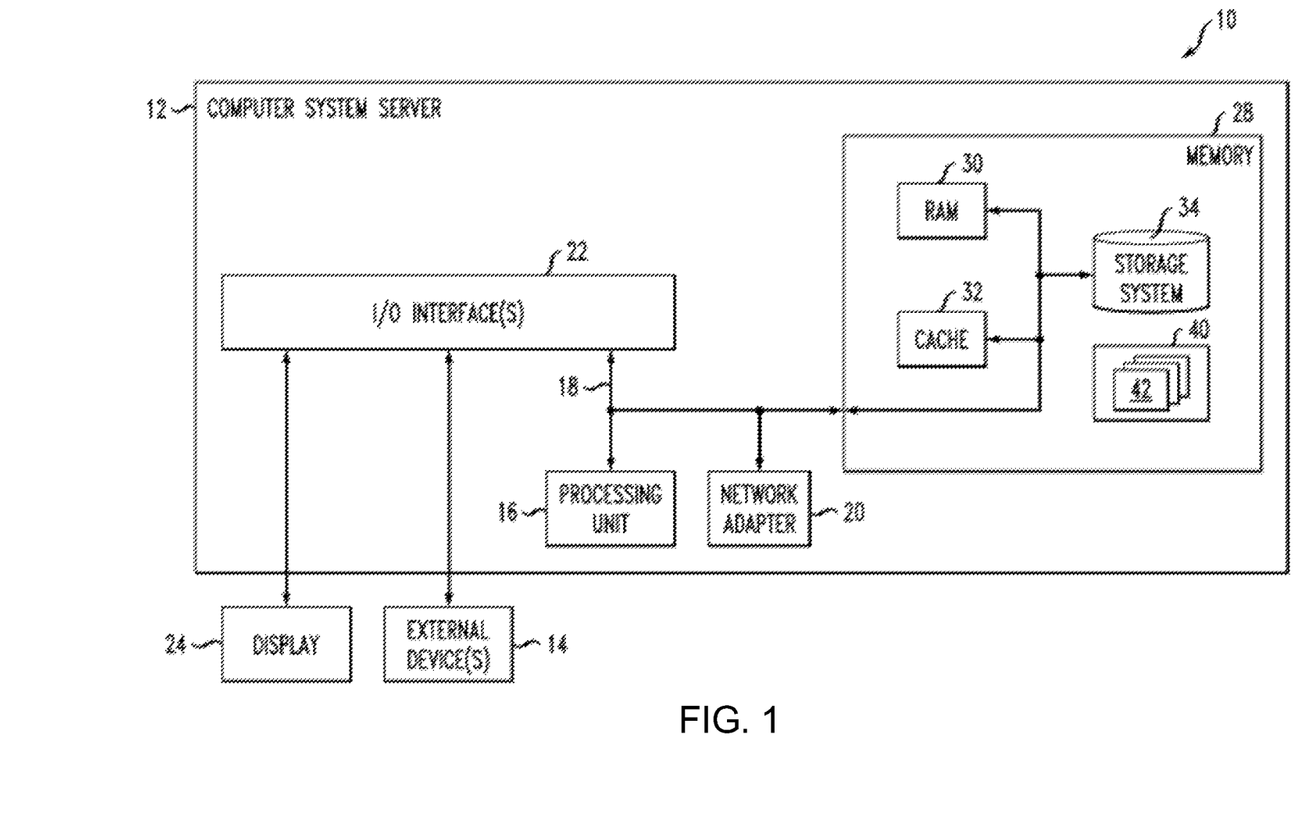
FIG. 1 depicts a schematic diagram illustrating an exemplary cloud computing node according to an embodiment.

Referring now to FIG. 1, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

Figure 2:
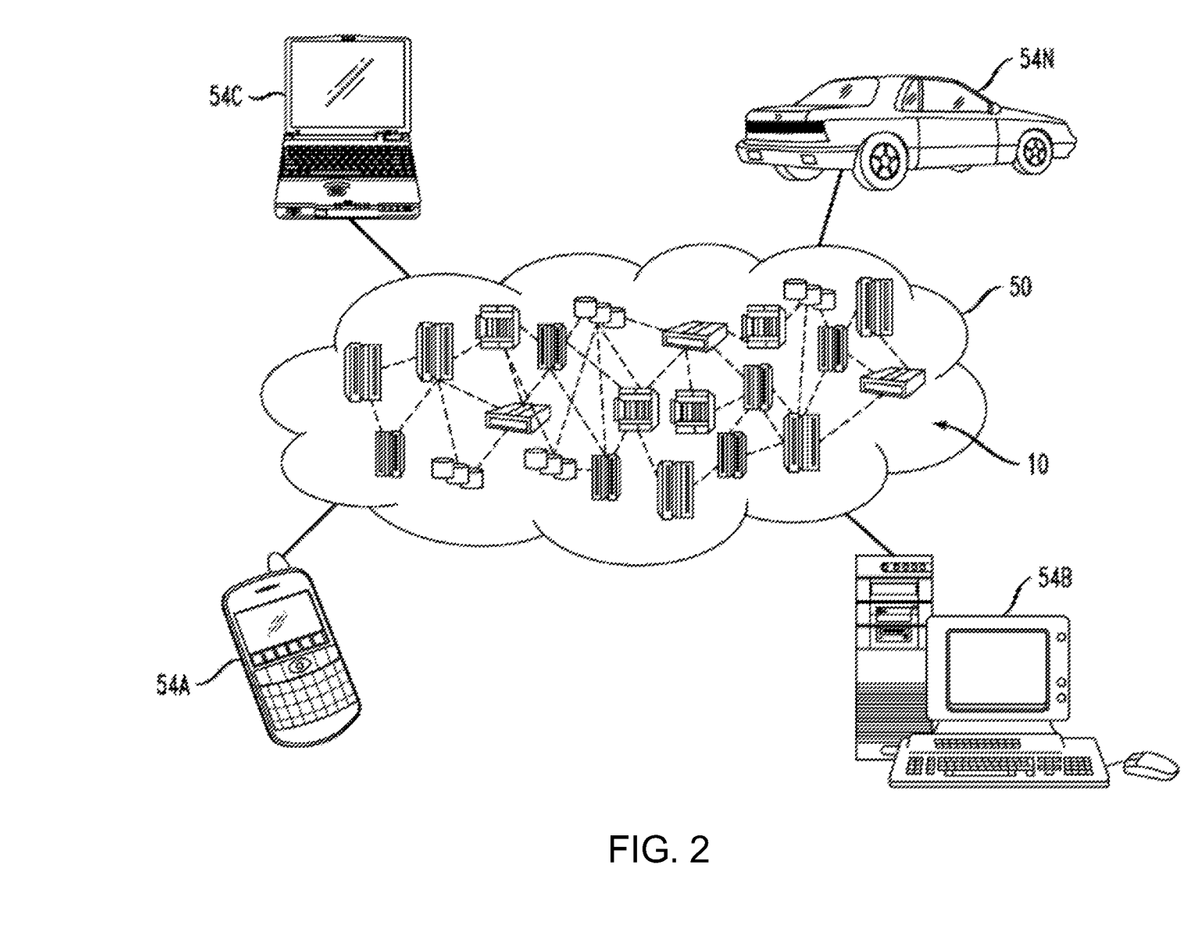
FIG. 2 depicts a schematic diagram illustrating an exemplary cloud computing environment according to an embodiment.

Referring now to FIG. 2, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 2 are intended to be illustrative only and that computing nodes 10 and cloud computing environment 50 can communicate with any type of computerized device over any type of network and/or network addressable connection (e.g., using a web browser).

Figure 3:
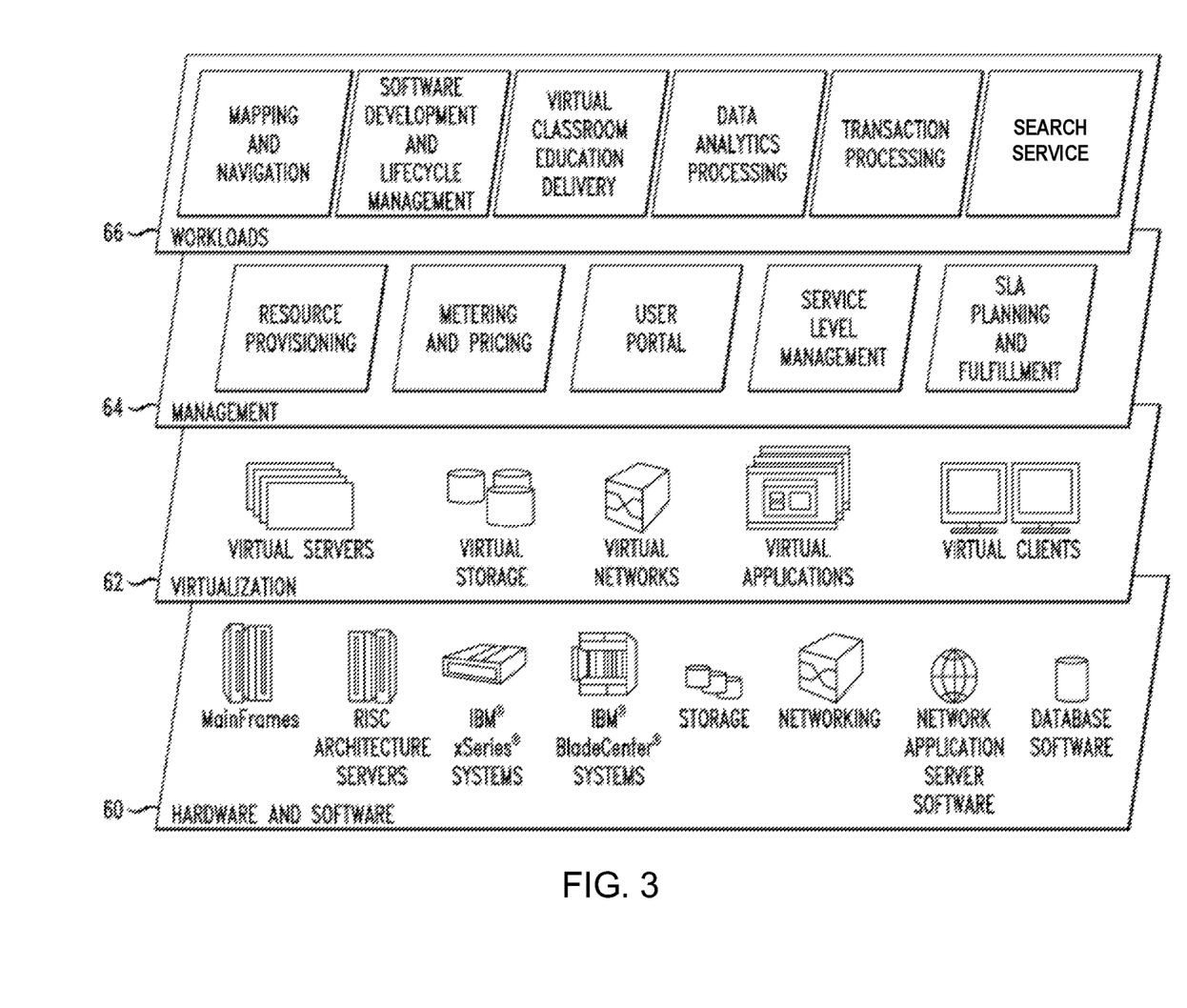
FIG. 3 depicts schematic diagram illustrating exemplary abstraction model layers according to an embodiment.

Referring now to FIG. 3, a set of functional abstraction layers provided by cloud computing environment 50 (FIG. 2) is shown. It should be understood in advance that the components, layers, and functions shown in FIG. 3 are intended to be illustrative only and embodiments of the invention are not limited thereto. As depicted, the following layers and corresponding functions are provided:

Hardware and software layer 60 includes hardware and software components. Examples of hardware components include mainframes, in one example IBM® zSeries® systems; RISC (Reduced Instruction Set Computer) architecture based servers, in one example IBM pSeries® systems; IBM xSeries® systems; IBM BladeCenter® systems; storage devices; networks and networking components. Examples of software components include network application server software, in one example IBM Web Sphere® application server software; and database software, in one example IBM DB2® database software. (IBM, zSeries, pSeries, xSeries, BladeCenter, WebSphere, and DB2 are trademarks of International Business Machines Corporation registered in many jurisdictions worldwide).

Virtualization layer 62 provides an abstraction layer from which the following examples of virtual entities may be provided: virtual servers; virtual storage; virtual networks, including virtual private networks; virtual applications and operating systems; and virtual clients.

In one example, management layer 64 may provide the functions described below. Resource provisioning provides dynamic procurement of computing resources and other resources that are utilized to perform tasks within the cloud computing environment. For example, cloud storage locations, e.g. a virtual storage of virtualization layer 62, may be provided. Metering and Pricing provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. For example, the identity of a user trying to access storage locations provided by the cloud infrastructure may be verified. User portal provides access to the cloud computing environment for consumers and system administrators, e.g. access to storage locations provided by the cloud infrastructure. Service level management provides cloud computing resource allocation and management such that required service levels are met. Service Level Agreement (SLA) planning and fulfillment provide pre-arrangement for, and procurement of, cloud computing resources for which a future requirement is anticipated in accordance with an SLA.

Workloads layer 66 provides examples of functionality for which the cloud computing environment may be utilized. Examples of workloads and functions which may be provided from this layer include: mapping and navigation; software development and lifecycle management; virtual classroom education delivery; data analytics processing; transaction processing; and providing a search service. The search service may be configured for automatically checking configuration changes intended to be applied to a search configuration of a search engine of the respective search service.

Figure 4:
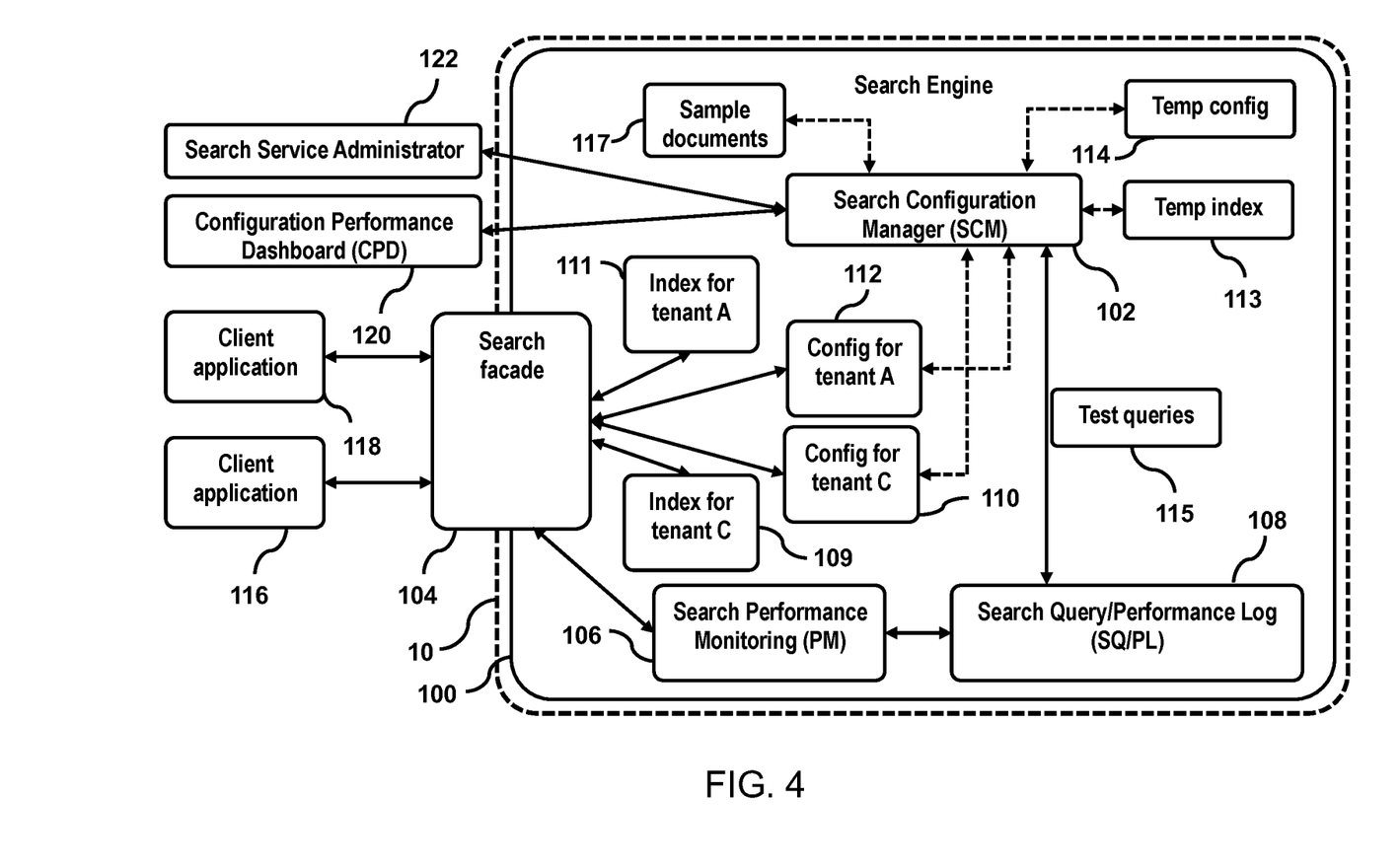
FIG. 4 depicts a schematic diagram illustrating an exemplary system for automatically checking search configurations.

FIG. 4 depicts a schematic diagram illustrating an exemplary system for automatically checking search configurations. The system may comprise a computer system, e.g. a cloud computing node 10, which provides a search engine 100 of a search service. The search engine 100 search engine is an information retrieval software program, e.g. one of the program modules 42 of a cloud computing node 10, configured for information retrieval and presentation in response to search queries. The search service may further comprise a search facade 104 for receiving requests for searches to be executed by the search engine 100 form client applications 116, 118 executed e.g. on tenant computer systems. The requests may comprise search queries based on which the search is executed or the search engine 100 may generate the respective queries based on the request received. The search facade 104 may further evaluating access rights and ensure that that each tenant requesting a query only sees data assigned to the respective tenant and/or for which the respective tenant is assigned with access rights. The search service may comprise a plurality of tenant specific search configurations 110, 112. Based on the search configurations 110, 112 a plurality of tenant specific search indexes 109, 111 may be provided. Each of the tenant specific search indexes 109, 111 may for example be assigned to one of the tenant specific search configurations 110, 112, which defines how the respective search index 109, 111 is generated. Depending on which tenant requests a search, the search facade 104 may select one the search configurations 110, 112 assigned to the requesting tenant. The search is then executed by the search engine according to the request using the selected search configuration 110, 112 and the search index 109, 111 assigned to the selected search configuration 110, 112.

The search engine 100 may be extended by a search configuration manager (SCM) component 102. The search configuration manager component 102 provides functionality for automatically testing and assessing potential search collection configuration modifications. When an intended configuration change for one of the search configurations 110, 112 is provided, the search configuration manager component 102 generates a temporary test search configuration 114. For creating the temporary test search configuration 114 the search configuration 110, 112 for which the configuration change is intended is copied and the respective configuration change is applied to the copy of the search configuration 110, 112. Furthermore, the search configuration manager component 102 may generate a temporary test search index 113 using the temporary test search configuration 114 with the applied configuration changes. For generating the test search index 113, the search configuration manager component 102 may use a set of sample documents 117.

The search configuration manager component 102 determines performance indicators for the executing of searches with the temporary test search configuration 114 using a set of test search queries 115 on the set of sample documents 117 according to the temporary test search configuration 114. The intended configuration change may e.g. be flagged as executable in a search engine or flagged as non-executable based on the result of the performance check. The intended configuration change is accepted for application to the search configuration, if the performance indicators satisfy a predefined criterion, i.e. at least one of the performance indicators exceeding a threshold. The accepted configuration change may either be implemented directly or displayed on a configuration performance dashboard (CPD) 120 as a suggested configuration change together with the search performance achieved based the respective configuration change. A search service administrator 122 may decide whether to implement the suggested configuration change displayed on the configuration performance dashboard 120. According to embodiments also the client applications 118, 116 may have access to the configuration performance dashboard 120 and decide whether to implement the suggested configuration change displayed thereon.

The test search queries 115 and sample documents 117 may e.g. be provided by the search service administrator 122 or one of the client applications 116, 118. According to embodiments, the search engine 100 is further extended by a search performance monitoring (PM) component 106. The search performance monitoring component 106 monitors searches executed on using the search configurations 112, 110 and/or on the temporary test search configuration 114. Based on the monitoring search queries used and performance results in the form of performance indicators may be logged using a search query/performance log (SQ/PL) component 108. The test search queries may e.g. be selected automatically based on an evaluation of the search query/performance log component 108. For example, search queries used most frequently in the past may be used as test search queries. According to embodiments the search query/performance log component 108 may further log search results, like e.g., documents comprising search hits for the searches defined by the logged search queries. For example, documents most frequently comprised hits in the past or comprised the most search hits in the past may be used as sample documents 117. Intended configuration changes to be checked may be requested by the search service administrator 122, a client application 116, 118, or determined by the search configuration manager 102 based on monitoring configuration changes applied to the search configurations 110, 112.

Figure 5:
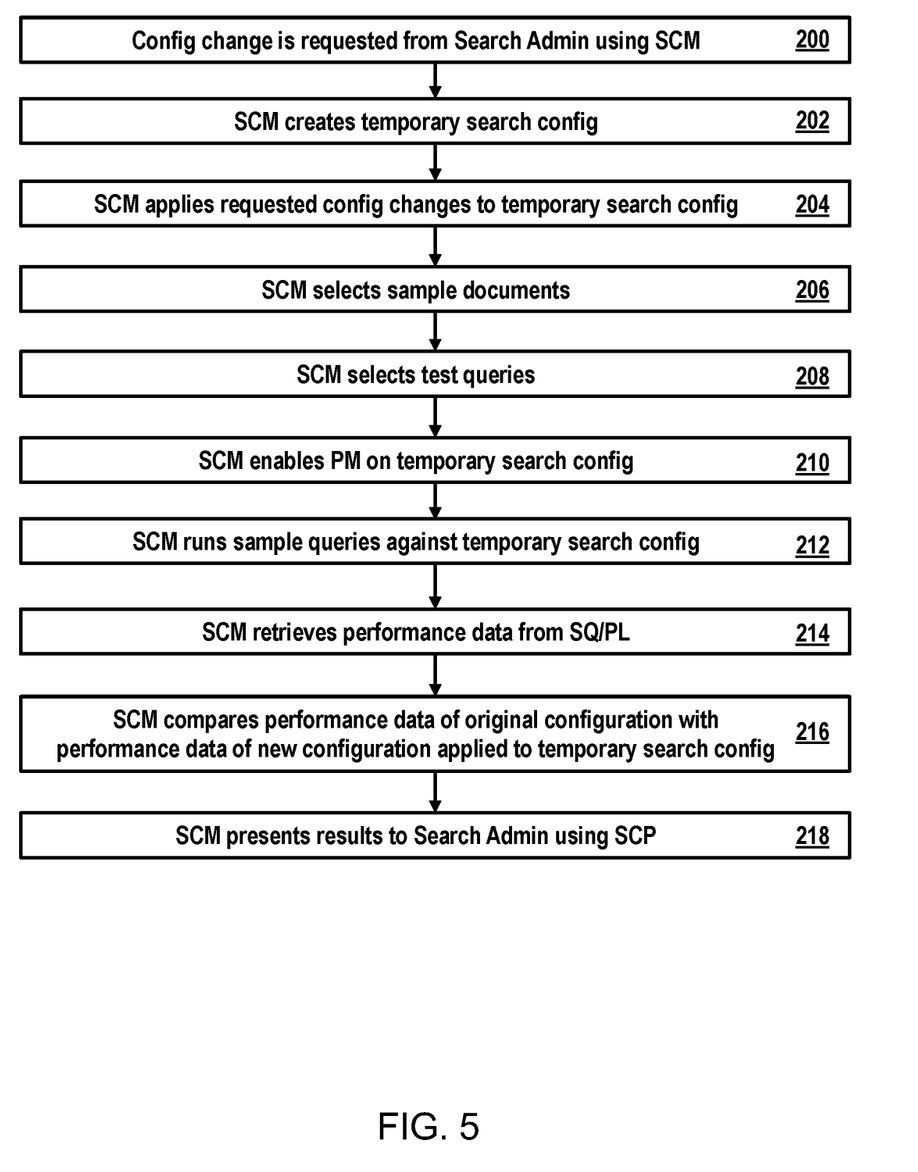
FIG. 5 depicts a schematic flow diagram of an exemplary method for automatically checking search configurations.

FIG. 5 depicts a schematic flow diagram of an exemplary method for automatically checking search configurations. In block 200, request for a configuration change of a search configuration is received using a search configuration manager (SCM) component. The request may e.g. be received via a user interface component, which allows to edit the search configurations. In block 202, a temporary test search configuration, i.e. a copy of an existing search configuration to be modified using the intended configuration change, is generated by the search configuration manager component. In block 204, the intended search configuration change is applied to the temporary test search configuration by the search configuration manager component. In block 206, sample search documents are selected by the search configuration manager component. In block 208, a set of representative search queries is selected as test search queries by the search configuration manager component. For this purpose, the search configuration manager component may comprise a selection component to select the set of search queries from logs of previous search queries for search configuration to be modified. The selected search queries may for example be search queries most often executed in a given time frame. In block 210, the search configuration manager component enables a performance monitoring on the test search configuration using a search performance monitoring component logging with a search query/performance log component the search queries executed as well as the search performance resulting from the configuration change in form of performance indicators. In block 212, the test queries are run using the test search configuration. In addition, the test queries be run using the original search configuration without the intended configuration change applied. An exemplary test query may be "description: HDTV OR filter (+promotion:tv+ promotion_date: [NOW/DAY-7DAYS TO NOW/DAY+ 1DAY])". In block 214, performance statistics for the search using the test search configuration based on performance indicators are retrieved from the search query/performance log component by the search configuration manager component. Furthermore, query responses may be retrieved. According to embodiments performance statistics are also retrieved for the search using the initial search configuration.

In block 216, the performance statistics retrieved in block 214 are evaluated. For example, it is checked whether the performance indicators satisfy a predefined criterion, like e.g. exceed a threshold. The threshold to be exceeded may be provided by performance indicators determined for executing the search using the initial search configuration:

| Query | Execution time (init. config) | Execution time (temp. config) |
| --- | --- | --- |
| description:HDTV OR filter(+promotion:tv +promotion_date:[NOW/DAY- 7DAYS TO NOW/DAY+1DAY]) | 0.345 s | 0.324 s |

In this example, the performance indicator considered is the execution time. Alternative and/or further performance indicators may be generated e.g. by analyzing collection metadata, content, configuration, indexing and query logs, user metadata, tenant metadata, performance metrics, error rates, etc. In case the execution time is reduced by implementing the intended configuration change, the respective configuration change may be accepted. In block 218, the results are presented to the search service administrator using a configuration performance dashboard (CPD). This may comprise creating and visualizing an assessment, whether to accept or reject the configuration changes, based on the comparison and scoring results. The search service administrator may decide based on the representation on the configuration performance dashboard whether to actually implement the intended configuration change.

In case execution times for a plurality of search queries are to be compared, a first sum may be calculated of the execution times of the search queries achieved with the test search configuration and a second sum may be calculated of the execution times of the search queries achieved with the initial search configuration. Then the two sums may be compared and the search configuration with fastest execution time, i.e. smallest sum, may be proposed as the optimal search configuration. Alternative, average execution times may be calculated instead of sums of execution times. According to embodiments, weighting factors may be provided for the test search queries, in order to indicate which of the test queries are more and which are less important. The weighting factors may e.g. be used to weight the performance indicators resulting from executing the respective test queries. The weighting factors may e.g. be based on a number of times the respective test queries have were executed in a given past time frame.

It is understood that one or more of the aforementioned embodiments of the invention may be combined as long as the combined embodiments are not mutually exclusive. Ordinal numbers, like e.g. 'first' and 'second', are used herein to indicate different element assigned with the same name, but do not necessarily establish any order of the respective elements.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the 'C' programming language or similar programming languages. The computer readable program instructions may execute entirely on the user computer system's computer, partly on the user computer system's computer, as a stand-alone software package, partly on the user computer system's computer and partly on a remote computer or entirely on the remote computer or server. In the latter scenario, the remote computer may be connected to the user computer system's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The invention claimed is:

1. A computer-implemented method for automatically checking one or more configuration changes intended to be applied to a search configuration of a search engine of a search service, the method comprising the steps of:
   providing, by one or more computer processors, the one or more intended configuration changes;
   creating, by one or more computer processors, a test search configuration, the creating of the test search configuration comprising copying, by one or more computer processors, the search configuration and applying, by one or more computer processors, the one or more intended configuration changes to the copy of the search configuration;
   providing, by one or more computer processors, a set of one or more sample documents;
   providing, by one or more computer processors, a set of one or more test search queries;
   executing, by one or more computer processors, the set of test search queries on the set of sample documents using the test search configuration;
   determining, by one or more computer processors, a set of one or more performance indicators for the executing of the set of test search queries;
   in response to the set of performance indicators satisfying a predefined criterion, accepting, by one or more computer processors, the one or more intended configuration changes for an application to the search configuration, wherein satisfying the predefined criterion requires at least one of the performance indicators of the set of performance indicators to exceed a threshold.

2. The computer-implemented method of claim 1, further comprising, in response to the set of the performance indicators not satisfying the predefined criterion, rejecting, by one or more computer processors, the one or more intended configuration changes.

3. The computer-implemented method of claim 1, in response to an acceptance of the application, the one or more intended configuration changes being applied, by one or more computer processors, to the search configuration.

4. The computer-implemented method of claim 1, the method further comprising:
   in response to accepting the one or more intended configuration changes for the application to the search configuration, issuing, by one or more computer processors, a request for a user approval to the one or more intended configuration changes; and
   in response to receiving a user approval to the one or more intended configuration changes, applying, by one or more computer processors, the one or more intended configuration changes to the search configuration.

5. The method of computer-implemented claim 1, wherein the step of providing the one or more intended configuration changes comprises receiving, by one or more computer processors, one or more of the intended configuration changes in a form of one or more user defined configuration changes.

6. The computer-implemented method of claim 1, wherein the step of providing the one or more intended configuration changes comprising deriving the one or more intended configuration changes using a first set of one or more additional search configurations, each additional search configuration being assigned with an additional search configuration change, each of the assigned additional search configuration changes being a search configuration change used in the past for adapting the search configuration to which it is assigned, the deriving of the intended configuration change comprises:
   determining, by one or more computer processors, one or more additional search configurations similar to the search configuration;
   identifying, by one or more computer processors, for each of the one or more additional search configurations similar to the search configuration the additional search configuration change assigned to the respective additional search configuration; and
   using, by one or more computer processors, one or more additional search configuration changes identified as the one or more intended search configuration changes.

7. The computer-implemented method of claim 6, wherein the step of determining one or more additional search configurations similar to the search configuration comprises:
   applying, by one or more computer processors, a clustering to the search configuration and the first set of additional search configurations; and
   identifying, by one or more computer processors, additional search configurations comprised by the same cluster as the search configuration to be similar to the search configuration.

8. The computer-implemented method of claim 1, wherein the performance indicators is selected from the group consisting of a response-time, an error rate, a memory consumption and a CPU consumption.

9. The computer-implemented method of claim 1, wherein the step of providing of the set of test queries comprises receiving, by one or more computer processors, one or more test queries in form of one or more user defined test queries.

10. The computer-implemented method of claim 1, wherein the step of providing the set of test queries comprises selecting, by one or more computer processors, one or more search queries from a set of one or more search queries applied to the search configuration in the past.

11. The computer-implemented method of claim 1, wherein the step of providing the set of test queries comprises selecting, by one or more computer processors, one or more search queries from a set of one or more search queries applied to one or more additional search configurations in the past.

12. The computer-implemented method of claim 1, wherein the threshold is derived using a set of one or more additional performance indicators determined for executing the set of test search queries on the set of sample documents using the search configuration.

13. The computer-implemented method of claim 1, wherein the threshold is derived using a set of one or more additional performance indicators achieved for executing search queries in the past.

14. The computer-implemented method of claim 1, wherein the step of providing the set of documents comprises receiving, by one or more computer processors, one or more sample documents in form of one or more user defined sample documents.

15. The computer-implemented method of claim 1, wherein the step of providing the set of sample documents comprises selecting, by one or more computer processors, one or more sample documents from a set of one or more documents for which the search configuration has been used in the past.

16. The computer-implemented method of claim 1, wherein the step of providing the set of one or more sample documents comprises selecting, by one or more computer processors, one or more sample documents from a set of one or more documents for which one or more additional search configurations have been used in the past.

17. The computer-implemented method of claim 1, further comprising:
   determining, by one or more computer processors, one or more additional search configurations of a second set of additional search configurations similar to the search configuration; and
   recommending, by one or more computer processors, for each of the one or more additional search configurations similar to the search configuration the one or more intended configuration changes accepted for application to the search configuration to be applied to the respective additional search configuration.

18. The computer-implemented method of claim 17, the step of determining one or more additional search configurations similar to the search configuration comprises:
   applying, by one or more computer processors, a clustering to the search configuration and the second set of additional search configurations, and
   identifying, by one or more computer processors, additional search configurations of the second set of additional search configurations comprised by the same cluster as the search configuration to be similar to the search configuration.

19. A computer program product for automatically checking one or more configuration changes intended to be applied to a search configuration of a search engine of a search service, the computer program product comprising:
  one or more computer readable storage media; and
  program instructions stored on the one or more computer readable storage media, the program instructions comprising:
    program instructions to provide the one or more intended configuration changes;
    program instructions to create a test search configuration, the creating of the test search configuration comprising copying, by one or more computer processors, the search configuration and applying, by one or more computer processors, the one or more intended configuration changes to the copy of the search configuration;
    program instructions to provide a set of one or more sample documents;
    program instructions to provide a set of one or more test search queries;
    program instructions to execute the set of test search queries on the set of sample documents using the test search configuration;
    program instructions to determine a set of one or more performance indicators for the executing of the set of test search queries;
    in response to the set of performance indicators satisfying a predefined criterion, program instructions to accept the one or more intended configuration changes for application to the search configuration, wherein satisfying the predefined criterion requires at least one of the performance indicators of the set of performance indicators to exceed a threshold.

20. A computer program system for automatically checking one or more configuration changes intended to be applied to a search configuration of a search engine of a search service, the computer system comprising:
  one or more computer processors;
  one or more computer readable storage media; and
  program instructions stored on the one or more computer readable storage media for execution by at least one of the one or more computer processors, the program instructions comprising:
    program instructions to provide the one or more intended configuration changes;
    program instructions to create a test search configuration, the creating of the test search configuration comprising copying, by one or more computer processors, the search configuration and applying, by one or more computer processors, the one or more intended configuration changes to the copy of the search configuration;
    program instructions to provide a set of one or more sample documents;
    program instructions to provide a set of one or more test search queries;
    program instructions to execute the set of test search queries on the set of sample documents using the test search configuration;
    program instructions to determine a set of one or more performance indicators for the executing of the set of test search queries;
    in response to the set of performance indicators satisfying a predefined criterion, program instructions to accept the one or more intended configuration changes for application to the search configuration, wherein satisfying the predefined criterion requires at least one of the performance indicators of the set of performance indicators to exceed a threshold.

* * * * *